Sept. 3, 1940.  C. S. HAZARD  2,213,278
DISPENSING PUMP
Filed Aug. 28, 1937  2 Sheets-Sheet 2
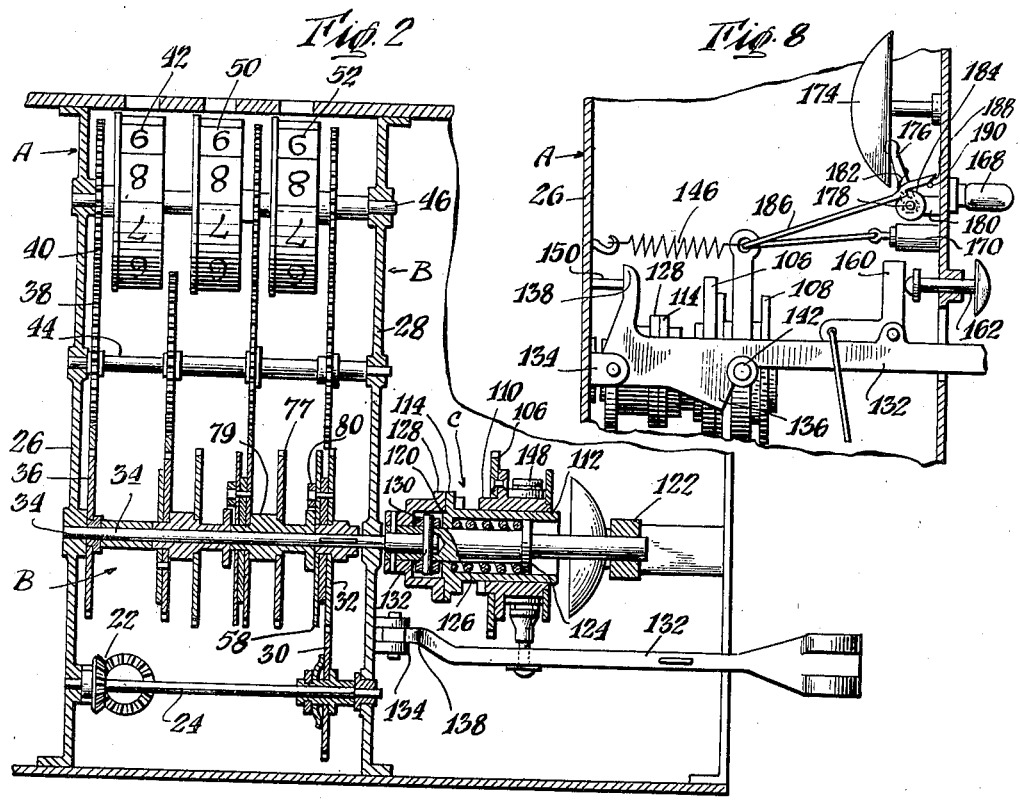
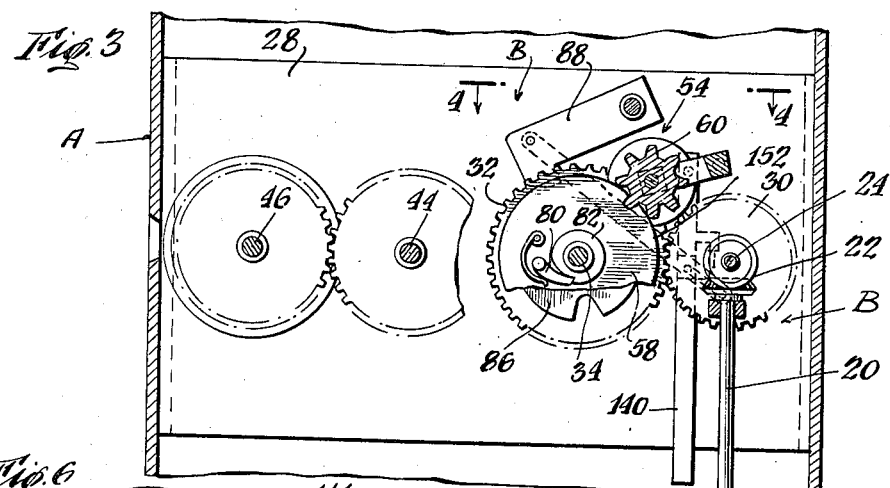
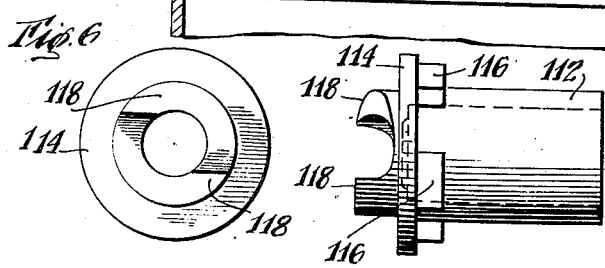
INVENTOR
Charles S. Hazard
BY
Hoguet, Neary & Campbell
ATTORNEYS Patented Sept. 3, 1940

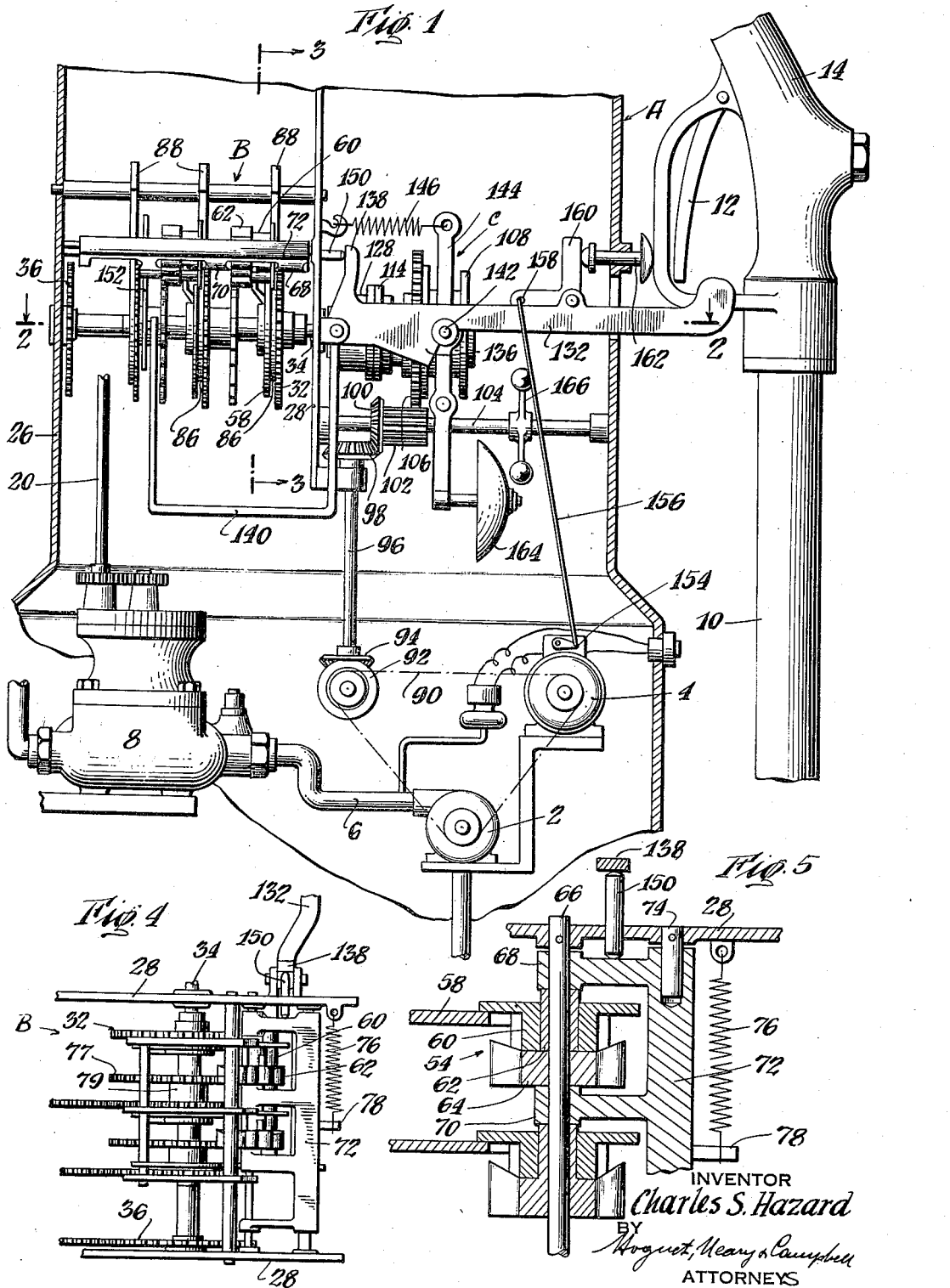

2,213,278

UNITED STATES PATENT OFFICE 2,213,278

DISPENSING PUMP

Charles S. Hazard, New York, N. Y., assignor to Neptune Meter Company, a corporation of New Jersey Application August 28, 1937, Serial No. 161,393

6 Claims. (Cl. 221—95)

This invention relates to liquid dispensing devices and particularly to dispensing devices having indicators or registers which indicate the volume and/or price of the liquid dispensed during a transaction, and which are adapted to be automatically reset to initial or zero position between each dispensing transaction.

In my copending application Serial No. 83,030 filed June 2, 1936, now Patent No. 2,109,353 dated February 22, 1938, I have disclosed a dispensing device which includes one or more registers or indicators actuated in response to operation of a liquid metering device. Liquid is delivered to the metering device by a motor driven pump, the motor also serving to supply energy for resetting the indicator during the intervals between dispensing transactions. This dispensing device is also provided with a liquid by-passing system which diverts the liquid from the meter during the interval that the indicator is being reset to zero position, thereby preventing the dispensing of liquid during the resetting operation.

I have discovered that, since the resetting operation is usually of short duration, the liquid by-passing system may be eliminated without disturbing the operation of the device if a suitable type of pump is used for delivering the liquid and if a warning means is provided for indicating that the indicator is being reset. The warning means serves to notify the attendant when the resetting operation is concluded and therefore restrains him from dispensing liquid during the resetting operation.

The principal object of the invention, therefore, is to provide an automatically resettable registering or indicating means, which includes means for signalling during the resetting operation.

A further object of the invention is to provide signalling means for the resettable indicators of dispensing pumps which indicate visually and/or audibly when the resetting operation is concluded by the return of the indicator to zero indication.

The objects of the invention have been attained by providing the registers for dispensing pumps which have automatically operable resetting means with visible and/or audible signalling devices, such as bells, lights, signal plates, or shutters which are actuated by the resetting means with visible and/or audible signalling devices, such as bells, lights, signal plates, or shutters which are actuated by the resetting means during and/or at the conclusion of a resetting operation to advise the operator when a dispensing transaction may be begun.

In the embodiment of the invention which is more specifically described later, the resetting means includes a clutch having a shiftable element for automatically connecting a motor and an indicator to reset the indicator and disconnecting them at the conclusion of a dispensing operation. The shiftable clutch element is operatively connected to signalling means for rendering the signal operative during or at the conclusion of the resetting operation.

Other forms of the invention will become apparent to those skilled in the art from a disclosure of a typical form of the invention, such as is shown in the accompanying drawings, in which:

Figure 1 is a sectional view of a dispensing device embodying the present invention with parts thereof broken away;

Figure 2 is a view in section taken on line 2—2 of Figure 1 with a nozzle of the dispensing hose removed from the hose support and with parts broken away;

Figure 3 is a broken sectional view taken on line 3—3 of Figure 1;

Figure 4 is a view in detail of a portion of the register;

Figure 5 is an enlarged sectional view of a detail of the register partly broken away;

Figure 6 is an enlarged end view of an element of the resetting mechanism;

Figure 7 is a side view of the element shown in Figure 6; and

Figure 8 is a side view of a modified form of signalling device shown partly in section and partly broken away.

One form of my novel signalling mechanism is shown in Figure 1 as applied to a dispensing device of the type disclosed in my copending application Serial No. 83,030 filed June 2, 1936. This form of dispensing apparatus includes a housing A in which is mounted a pump 2 actuated by a motor 4 for delivering liquid from a source of supply by means of a conduit 6 to a meter 8 of any desired type. The liquid passes from the meter 8 to the usual dispensing hose 10 from which the liquid may be dispensed under the control of a hand operated valve 12 in the nozzle 14.

The pump 2 may be of any suitable type which allows a slippage of liquid therein, such as, for example, a centrifugal pump or a pump provided with a leakage port and valve whereby the pump is enabled to continue operation without delivering liquid to the meter if a back pressure, such as will be produced by closing the hand valve 12, is created in the conduits.

The meter, during passage of liquid therethrough, actuates a register generally indicated as B for indicating to the customer the quantity of liquid dispensed and/or the cost of the liquid dispensed as may be desired. Operation of the meter by passage of liquid therethrough causes rotation of a shaft 20, which through suitable gearing 22 rotates a shaft 24 which is journalled in the side plates 26 and 28 of the register. The shaft 24 carries a gear 30 which is frictionally clutched to the shaft 24, and meshes with a drive gear 32 keyed to the main drive shaft 34 of the register. The main drive shaft 34 is journalled in the side plates 26 and 28 and carries at its left-hand end a gear 36 which, by means of an idler gear 38 and gear 40 which is fixed to the units drum 42 of the register B, causes a displacement of the units drum through one complete revolution for every gallon of liquid dispensed. The idler gear 38 and the gear 40 are rotatably mounted upon shafts 44 and 46 respectively, which are also journalled in the side plates 26 and 28 of the register. The tens drum 50 and the hundreds drum 52 are supported for rotation relative to the shaft 46 and are driven by means of suitable Geneva gearing 54 to indicate respectively tens and hundreds of gallons of liquid delivered.

The Geneva gearing is best shown in Figures 4 and 5, and is identical for each of the successive drums. Each Geneva gear device consists of a mutilated gear 58 which meshes with and rotates a pinion 60. The pinion 60 is rotatably mounted on the sleeve 62 of a similar pinion 64, which is in turn rotatably mounted upon a shaft 66 fixed in the side walls 26 and 28 of the register casing. The pinion 60 is provided with a flange which bears against one side of the mutilated gear 58 and therefore is retained against axial displacement relative to the mutilated gear 58. The pinion 64 is provided with outwardly tapering teeth which engage between the teeth of the pinion 60 to cause them to rotate together when they are in engagement. The pinion 64 and its sleeve 62 are mounted between the arms 68 and 70 of a yoke member 72, which is shiftably mounted upon pins 74 extending inwardly from the side plates 26 and 28 of the register housing. As viewed in Figure 5, a downward shifting of the yoke 72 will cause downward movement of pinion 64 relative to the pinion 60 and will free them for independent rotation. The pinions 60 and 64 are, however, normally retained in driving engagement by means of a spring 76 having its opposite ends fixed to the side plate 28 and a pin 78 carried by the yoke 72. The pinion 64 meshes with a gear 77 fixed to a sleeve 79 for driving the tens drum 50 or the hundreds drum 52 by means of suitable gearing. It will be seen that by shifting the yoke 72 the units drum 42, the tens drum 50 and the hundreds drum 52 may be released for independent rotation and simultaneous return to zero or initial position.

As best shown in Figures 1, 2, 6 and 7, I have provided automatically operated means for returning the numeral drums to zero position. This automatic resetting means, generally indicated as C, may consist of a clutch mechanism connected with the main drive shaft 34 of the register and the pump motor 4. Also, suitable pickup mechanisms are provided for returning the indicating drums to zero position upon rotation of the main drive shaft 34 by means of the clutch and motor 4. As previously mentioned and shown in Figure 5, the yoke 72 is shiftable against the tension of the spring 76 to move the pinions out of engagement to allow simultaneous rotation of the units, tens and hundreds indicating drums. Upon rotation of shaft 34, the drive gear 32 and the associated mutilated gear 58 are rotated. The mutilated gear carries a pawl 80 which engages a single toothed ratchet 82 associated with the next higher indicating drum and causes them to rotate together towards zero position. Between each mutilated gear 58 and each drive gear 32 is disposed a notched plate 86, which is engaged by a pawl 88 pivotally supported between the side plates 26 and 28. Each pawl 88 is rigidly connected with the other two similar pawls and as a unit is adapted to drop into the notches in the plates 86 when the indicating drums 42, 50 and 52 are at zero position.

The clutch mechanism C is actuated by the motor 4 by means of a chain or belt 90, which also connects the motor 4 to the pump 2. Operation of the motor 4 drives the chain 90 to rotate bevel gears 92 and 94, the latter being fixed to a shaft 96 which is journalled on the side plate 28 of the register. The shaft 96 carries a bevel gear 98 at its upper end which meshes with and drives a bevel gear 100 and a barrel gear 102. The barrel gear 102, which is mounted on a shaft 104 rotatably mounted in the meter housing, engages and drives a large gear 106. The large gear 106 is fixed to a collar 108. As best shown in Figure 2, the collar 108 includes a clutch element 110 and is slidable along and journalled on a sleeve 112. The sleeve 112 as shown in Figures 6 and 7 includes a flange 114 having longitudinally extending clutch lugs 116 thereon, which cooperate with the clutch element 110 in one position of the collar 108. The sleeve 112 is also provided with spaced cam faces 118 which serve to move the sleeve lengthwise of a shaft 120. The sleeve 112 is supported for rotation on an enlarged portion of the shaft 120, which is fixed to the main drive shaft 34 of the register. One end of the enlarged shaft 120 is journalled in a bracket 122 fixed to the frame A. The shaft 120 is also provided with a flange 124 and carries a spring 126 which is disposed between the flange 124 and the end of the sleeve 112, thereby normally forcing the flange 114 into engagement with the housing 128 which is also fixed to the shaft 120. The cam faces 118 are thus forced into engagement with the rollers 130 which are rotatably mounted on a pin 132 which passes through the shaft 120. The spring 126 normally acts to force the rollers 130 into the valleys of the cams 118, and causes the sleeve 112 to rotate with the shaft 120. However, when the register B is locked in zero position by engagement of the pawls 88 in the notches in the plates 86, and the sleeve 112 is rotated relatively to the shaft 120 by motor 4, the cam faces 118 ride up on the rollers 130 displacing the sleeve 112 and the collar 108 to the right, as viewed in Figure 2.

Engagement and dis-engagement of the clutch elements 110 and 116 are controlled by any suitable means such as the hose support 132, which is pivotally mounted between lugs 134 fixed on the frame plate 28. The hose support 132 is provided with a cam lug 136 on its lower edge, a lever 138 on its upper edge, and a U-shaped lever 140 projecting downward from a point adjacent the lugs 134. The cam lug 136 cooperates with a pin 142 which is fixed to a yoke 144, the latter being pivotally mounted on the housing A. The arms of the yoke 144 are disposed within the collar 108 and are normally urged by a spring 146 in a counterclockwise direction, as viewed in Figures 1 and 2. The pin 142 and cam lug 136 retain the yoke 144 in the position shown in Figure 1, except during a resetting operation. In the position shown, the clutch element 110 and the clutch lugs 116 are disengaged allowing the register B to be operated by the meter 8.

The spring 146 normally tends to cause the clutch elements 110 and 116 to engage. The yoke 144 carries rollers 148 which engage within the collar 108 to reduce the friction therebetween as the collar is rotated by the motor 4. The upwardly projecting lever 138 on the hose support 132 engages a pin 150, which is mounted for free sliding movement in the frame plate 28 and engages the yoke 72, whereby upward movement of the hose support will shift the yoke 72 to the left to disengage the pinions 60 and 64. The U-shaped lever 140 is connected by means of a link 152 to the pawls 88 whereby upward movement of the hose support in initiating the resetting operation will permit the pawls 88 to drop and enter the notches in the disks 86 when the indicating wheels reach zero position.

The motor 4 may be started and stopped by means of a switch 154 which is connected by a link 156 to a pin 158 which is mounted on one arm of a bell crank lever 160, and extends across the top of the hose support 132. When the nozzle 14 is placed upon the support 132, a portion of the nozzle engages a pin 162, which is slidably mounted in the housing A and shifts it to the left, thereby rocking the bell crank lever 160 about its pivot and moving the switch to "off" position.

Removal of the nozzle 14 from the hose support 132 followed by upward movement of the hose support rocks the bell crank lever 160 in a clockwise direction, starting the motor and at the same time releases the yoke 144 for movement to the left as viewed in Figure 1, thereby engaging the clutch elements 110 and 116 to rotate the main drive shaft 34 of the register. Simultaneously with upward movement of the hose support 132, the upwardly projecting lever 138 will shift the pin 150 and the pinion yoke 72, releasing the indicating drums for rotation to zero position.

The movement of the yoke 144 is utilized to actuate a signalling device during return of the indicator to zero position. The signalling device illustrated in Figure 1 may consist of a bell or gong 164 mounted upon an extension of the yoke 144. A suitable clapper 166 for the bell is fixed to shaft 104 so that the clapper will strike the bell when the yoke 144 is in its resetting position. When the yoke 144 is rotated to the position disclosed in Figure 1, the clapper 166 does not engage the bell or gong 164.

If desired, a visual signalling device may also be provided for actuation during resetting of the register B. This construction (Figure 8) may consist of a light 168 provided with a switch 170 of the push button type, which is connected by means of a link to the upper end of the yoke 144, whereby the light may be turned on during the resetting operation and turned off at the conclusion of the resetting operation.

Another form of signalling means is disclosed in Figure 8, this construction consisting of a gong 174 mounted on the housing A of the dispensing device. A clapper 176 is fixed to a shaft 178 which is rotatably mounted in bearings 180 on the pump housing. A coil spring 182 encircling the shaft 178 normally urges the clapper 176 into engagement with the gong 174. The shaft 178 is provided with a single tooth ratchet 184 having the tooth disposed substantially vertically which is engaged by a pawl 186 pivotally connected to the upper end of the yoke 144. The outermost end of the pawl 186 is provided with a cam surface 188 which bears against a pin 190 arranged parallel to the meter housing. The cam surface 188 and pin 190 are so related that when the yoke 144 reaches its right-hand position the pawl 186 is moved out of engagement with the ratchet 184. During movement of the pawl to the right, energy is stored in the spring 182 to return the clapper into engagement with the gong 174 when the pawl 186 clears the ratchet 188. Movement of the yoke 144 in a counterclockwise direction will cause the pawl 186 to again engage the ratchet 184 preparatory to moving it away from engagement with the gong 174.

In operation, when the hose support 132 is lifted the motor 4 is started, the clutch elements 110 and 116 engage, and the indicator wheels 42, 50 and 52 are released for return to zero position. The motor 4 through the resetting mechanism C returns the indicator to zero position, at which time the pawls 88 will prevent further rotation of the main drive shaft 34. The cam faces 118 on the sleeve 112 then rotate relative to the shaft 34 and because of their engagement with the rollers 130 will displace the collar 108 to the right, as viewed in Figure 1. Movement of the collar 108 and the yoke 144 to the right allows the pin 142 to clear the cam lug 136 and the hose support 132 to drop, locking the yoke 144 in the position disclosed in Figure 1. Continued rotation of the sleeve 112 will move the cams 118 relative to the rollers 130 until the latter disengage the crests of the cams. The sleeve 112 will then be moved to the left by the spring 126, disengaging the clutch elements 110 and 116 and disconnecting the register B from the motor 4. During the time that the yoke is in its counterclockwise displaced position, the light 168 will be lighted and/or the audible signalling means comprising the gong 164 and clapper 166 will be actuated. However, when the yoke is returned to its right-hand or clockwise position, the circuit in the light 168 will be broken and the gong 164 will be moved out of position in which the clapper can engage it.

The operation of the audible signal device disclosed in Figure 8 is similar, with the exception that during the resetting operation no sound is produced. At the conclusion of the dispensing operation the gong 174 is struck by the clapper 176 to give an audible indication that the indicator has been returned to zero position.

It will be understood from the preceding description that I have provided a simple organization which effectively and positively indicates the condition of the indicator during and/or at the conclusion of a dispensing operation. It will also be understood that the above described examples of my invention may be modified in many ways such as by providing other types of signalling devices and by actuating the signalling devices by other means than those disclosed. Therefore, the embodiments described above should be considered as illustrative only and not as limiting the scope of the following claims.

I claim:

1. In a liquid dispensing device, the combination of means for pumping liquid, an indicator movable away from an intitial position in proportion to the quantity of liquid dispensed, means for resetting the indicator to the initial position, means for actuating the liquid pumping means and the means for resetting the indicator including a movable clutch element, and signalling means operatively connected to and actuated in response to movement of the clutch element during resetting of the indicator.

2. In a liquid dispensing device, the combination of an indicator movable away from an initial position in proportion to the quantity of liquid dispensed, means for resetting the indicator to initial position, means for actuating the resetting means including a movable clutch element, and means operatively connected to and controlled by the clutch element for signalling to indicate that the indicator is being reset.

3. In a liquid dispensing device, the combination of means for delivering liquid, an indicator movable away from an initial position in proportion to the quantity of liquid delivered, means for resetting the indicator to said initial position, common means for simultaneously actuating the liquid delivering means and the resetting means, and means operatively connected to and actuated by the resetting means to signal and thereby restrain the attendant from making delivery of liquid while the indicator is being reset to initial position.

4. In a liquid dispensing device, the combination of means for delivering liquid, an indicator movable away from an initial position in proportion to the quantity of liquid delivered, means for resetting the indicator to said initial position, common means for simultaneously actuating the liquid delivering means and the resetting means, and signal means operatively connected to said resetting means to provide two distinguishable signals, said signal means being adapted to give one of said signals during a resetting operation and to give the other of said signals at the conclusion of the resetting operation.

5. In a liquid dispensing device, the combination of means for delivering liquid, an indicator movable away from an initial position in proportion to the quantity of liquid delivered, means for resetting the indicator to said initial position, common means for simultaneously actuating the liquid delivering means and the resetting means, means operatively connected to and actuated by the resetting means for giving a visual signal to thereby restrain the attendant from making a delivery while the indicator is being reset and means operatively connected to the resetting means for giving an audible signal at the conclusion of a resetting operation.

6. In a liquid dispensing device, the combination of means for delivering liquid, an indicator movable away from an initial position in proportion to the quantity of liquid dispensed, means for resetting the indicator to initial position, means including a movable element for simultaneously actuating said delivery means and said resetting means, and signalling means operatively connected to and actuated in response to movement of said element during a resetting operation.

CHARLES S. HAZARD.

CERTIFICATE OF CORRECTION.

Patent No. 2,213,278. September 3, 1940.

CHARLES S. HAZARD.

It is hereby certified that error appears in the printed specification of the above numbered patent requiring correction as follows: Page 1, first column, lines 49, 50 and 51, strike out the words "with visible and/or audible signalling devices, such as bells, lights, signal plates, or shutters which are actuated by the resetting means"; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.